US012652361B2

(12) United States Patent
Nakamura et al.

(10) Patent No.: US 12,652,361 B2
(45) Date of Patent: Jun. 9, 2026

(54) IMAGE READING APPARATUS AND IMAGE FORMING APPARATUS THAT IMPROVE SKEW CORRECTION ACCURACY

(71) Applicant: CANON KABUSHIKI KAISHA, Tokyo (JP)

(72) Inventors: Takatsugu Nakamura, Saitama (JP); Toshimitsu Nagoya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 18/424,958

(22) Filed: Jan. 29, 2024

(65) Prior Publication Data

US 2024/0267475 A1 Aug. 8, 2024

(30) Foreign Application Priority Data

Feb. 3, 2023 (JP) ................................. 2023-015150

(51) Int. Cl.
| | |
|---|---|
| *H04N 1/053* | (2006.01) |
| *H04N 1/00* | (2006.01) |
| *H04N 1/028* | (2006.01) |
| *H04N 1/10* | (2006.01) |
| *H04N 1/12* | (2006.01) |

(52) U.S. Cl.
CPC ......... *H04N 1/053* (2013.01); *H04N 1/00588* (2013.01); *H04N 1/02815* (2013.01); *H04N 1/1061* (2013.01); *H04N 1/1215* (2013.01)

(58) Field of Classification Search
CPC ............... H04N 1/053; H04N 1/00588; H04N 1/02815; H04N 1/1061; H04N 1/1215
See application file for complete search history.

(56) References Cited

U.S. PATENT DOCUMENTS

| | | | | |
|---|---|---|---|---|
| 2011/0038017 A1* | 2/2011 | King | .................. | H04N 1/00795 |
| | | | | 358/474 |
| 2013/0182296 A1* | 7/2013 | Masaki | .............. | H04N 1/00278 |
| | | | | 358/488 |
| 2018/0295256 A1* | 10/2018 | Yasaki | ................... | H04N 1/193 |
| 2020/0137262 A1* | 4/2020 | Kubo | ................... | H04N 1/1061 |

FOREIGN PATENT DOCUMENTS

JP        2010118911 A        5/2010

* cited by examiner

*Primary Examiner* — Nicholas Pachol

(74) *Attorney, Agent, or Firm* — ROSSI, KIMMS & McDOWELL LLP

(57) ABSTRACT

An image reading apparatus includes a conveying unit, a transparent member, a reading unit, and an opposing member. The reading unit includes a light source configured to irradiate a document with light, and a reading portion configured to read an image of a document conveyed by the conveying unit through reflection light of the light irradiated from the light source via the transparent member. The opposing member is disposed to face the transparent member in an opposing direction at a reading position of the reading unit and configured to form the conveyance path together with the transparent member. The opposing member includes an uneven surface portion facing the transparent member. The uneven surface portion includes a plurality of projecting portions which is regularly and continuously arranged when viewed in the opposing direction.

19 Claims, 11 Drawing Sheets

FIG.3

POSITION IN MAIN SCANNING DIRECTION[$\mu$m]

IMAGE READING APPARATUS AND IMAGE FORMING APPARATUS THAT IMPROVE SKEW CORRECTION ACCURACY

BACKGROUND OF THE INVENTION

Field of the Invention

The present invention relates to an image reading apparatus that reads an image such as a sheet-like document, and an image forming apparatus to which the image reading apparatus is applied.

Description of the Related Art

Hitherto, an image reading apparatus that detects a skew amount of a document conveyed from a document conveyance apparatus by a reading sensor that reads an image of the document and performs skew correction by image processing has been developed (see JP 2010-118911 A). In this image reading apparatus, when a document leading edge passes through a platen member (opposing member) provided on the opposing side of the reading sensor, the platen member and the document leading edge projected on the guide are read. At the same time, the skew amount of the document is detected by reading the luminance change of the shadow formed on the platen member by the document leading edge being illuminated by the illumination of the reading apparatus.

However, depending on the state of the surface of the platen member, a portion where specular reflection partially occurs may be formed. In such a portion, there is a possibility that the accuracy of detecting the shadow of the leading edge of the document is reduced, and thus there is a possibility that the accuracy of skew correction of the document is reduced.

The present invention provides an image reading apparatus and an image forming apparatus capable of improving the accuracy of skew correction.

SUMMARY OF THE INVENTION

According to a first aspect of the present invention, an image reading apparatus includes a conveying unit configured to convey a document in a conveyance path, a transparent member configured to form a part of the conveyance path, a reading unit including a light source configured to irradiate a document with light, and a reading portion configured to read an image of a document conveyed by the conveying unit through reflection light of the light irradiated from the light source via the transparent member, and an opposing member disposed to face the transparent member in an opposing direction at a reading position of the reading unit and configured to form the conveyance path together with the transparent member. The opposing member includes an uneven surface portion facing the transparent member and including a plurality of projecting portions which is regularly and continuously arranged when viewed in the opposing direction.

According to a second aspect of the present invention, an image reading apparatus includes a conveying unit configured to convey a document along a conveyance path, a transparent member configured to form a part of the conveyance path, a reading unit including a light source configured to irradiate a document with light, and a reading portion configured to read an image of a document conveyed by the conveying unit through reflection light of the light irradiated from the light source via the transparent member, and an opposing member disposed to face the transparent member in an opposing direction at a reading position of the reading unit and configured to form the conveyance path together with the transparent member. The opposing member includes an uneven surface portion facing the transparent member and including a plurality of recess portions which is regularly and continuously arranged when viewed in the opposing direction.

According to a third aspect of the present invention, an image reading apparatus includes a conveying unit configured to convey a document along a conveyance path, a transparent member configured to form a part of the conveyance path, a reading unit including a light source configured to irradiate a document with light, and a reading portion configured to read an image of a document conveyed by the conveying unit as reflection light of the light irradiated from the light source via the transparent member, and an opposing member disposed to face the transparent member in an opposing direction at a reading position of the reading unit and configured to form the conveyance path together with the transparent member. The opposing member includes an uneven surface portion facing the transparent member. The opposing member includes an uneven surface portion facing the transparent member, the uneven surface portion including a plurality of projecting portions and a plurality of recess portions which are regularly and continuously arranged when viewed in the opposing direction.

According to a fourth aspect of the present invention, an image forming apparatus includes the image reading apparatus configured to read an image of a document, and an image forming unit configured to form an image on a sheet based on image information read by the image reading apparatus.

Further features of the present invention will become apparent from the following description of exemplary embodiments with reference to the attached drawings.

BRIEF DESCRIPTION OF THE DRAWINGS

FIG. 3 is a cross-sectional view showing the automatic document reading apparatus according to the embodiment.

DESCRIPTION OF THE EMBODIMENTS

Hereinafter, exemplary embodiments for carrying out the present invention will be described with reference to the drawings.

Figure 1:
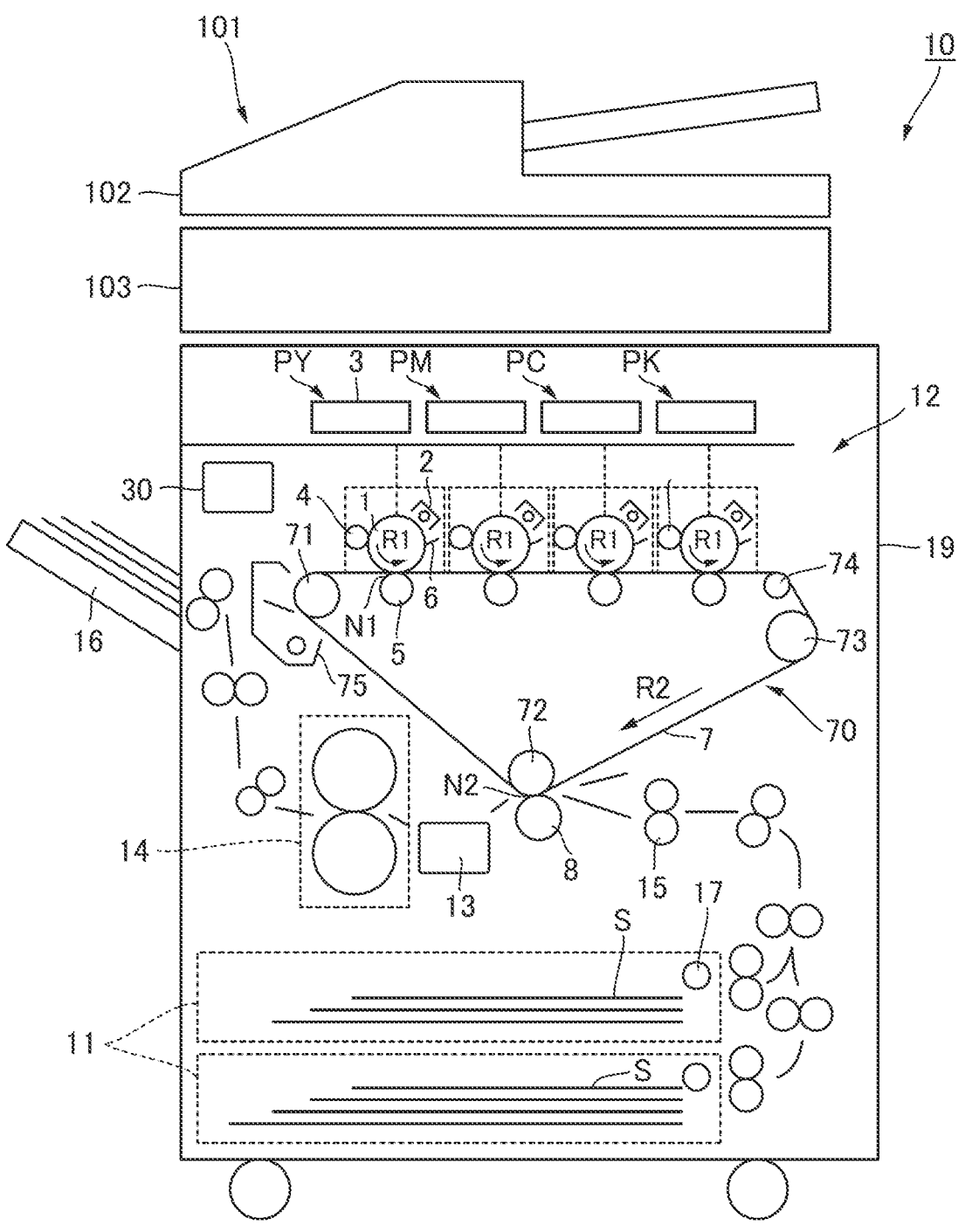
FIG. 1 is a cross-sectional view showing an image forming apparatus according to an embodiment.

FIG. 1 is a schematic diagram of an automatic document reading apparatus 101 which is an example of an image reading apparatus according to an embodiment of the present disclosure and an image forming apparatus 10 including the automatic document reading apparatus 101.

First, a schematic configuration of the image forming apparatus 10 will be described.

Image Forming Apparatus

The image forming apparatus 10 of the present embodiment is a tandem-intermediate-transfer-type copying machine that outputs a full-color image to a recording material by an electrophotographic system. The image forming apparatus 10 includes an image forming unit 12 and a control unit 30. The image forming unit 12 includes image forming stations PY, PM, PC, and PK that form toner images of yellow (Y), magenta (M), cyan (C), and black (K), respectively, an intermediate transfer unit 70, and a fixing unit 14. The image forming unit 12 forms an image on a sheet S based on image information read by the automatic document reading apparatus 101.

When the image forming apparatus 10 executes an image forming operation, each of the image forming stations PY to PK creates a single-color toner image by an electrophotographic process. Since the image forming stations PY to PK have the same configuration except that the color of the toner is different, a yellow image forming station PY will be described here. A photosensitive drum 1 as an image bearing member is rotationally driven in a predetermined rotation direction R1, and a charger 2 uniformly charges the surface of the photosensitive drum 1. An exposing unit 3 scans the photosensitive drum 1 using a laser beam modulated based on data obtained by decomposing image data for each color component, and writes an electrostatic latent image on the surface of the drum. This latent image is developed by a developer supplied from a developing unit 4 and visualized as a toner image.

In an intermediate transfer unit 70, an intermediate transfer belt 7 as an intermediate transfer member is wound around a driving roller 71, a secondary transfer inner roller 72, and a tension roller 73. When the image forming operation is started, the intermediate transfer belt 7 is rotationally driven by the driving roller 71 in a rotation direction R2 along with the photosensitive drum 1. The toner image formed in each of the image forming stations PY to PK and borne on the photosensitive drum 1 is primarily transferred from the photosensitive drum 1 to the intermediate transfer belt 7 at a primary transfer portion N1 by the bias electric field formed by the primary transfer roller 5. At this time, the toner images of the respective colors are multiple-transferred so as to overlap each other, whereby a full-color toner image is formed on the surface of the intermediate transfer belt 7. Further, deposits such as transfer residual toner remaining on the photosensitive drum 1 without being transferred to the intermediate transfer belt 7 are removed by a drum cleaner 6 of each station.

A secondary transfer roller 8 is disposed at a position facing the secondary transfer inner roller 72 with the intermediate transfer belt 7 interposed therebetween, and a secondary transfer unit N2 is formed as a nip portion between the secondary transfer roller 8 and the intermediate transfer belt 7. The toner image borne on the intermediate transfer belt 7 is secondarily transferred to a sheet S, which is a recording material, conveyed one by one toward the secondary transfer unit N2 in the secondary transfer unit N2. Deposits such as transfer residual toner remaining on the intermediate transfer belt 7 without being transferred to the sheet S are removed by a belt cleaner 75.

The sheet S to which the toner image has been transferred in the secondary transfer unit N2 is sent to the fixing unit 14 via a conveyor belt 13. The fixing unit 14 includes a rotary member pair that nips and conveys the sheet S and a heat source such as a halogen lamp that heats the toner image on the recording material, and heats and pressurizes the toner image while conveying the sheet S by the rotary member pair. As a result, the toner is melted and then fixed, whereby an image fixed to the sheet S is obtained.

In parallel with such a process, a conveyance operation of feeding the sheet S and conveying the sheet S toward the secondary transfer unit N2 is performed. The image forming apparatus 10 includes a plurality of feeding cassettes 11 that stores sheets S in a lower portion of an apparatus body 19, and feeds the sheets S one by one from one of the feeding cassettes 11. As the sheet S, various sheets of different sizes and materials, such as paper such as plain paper and thick paper, a sheet material subjected to surface treatment such as a plastic film, cloth, and coated paper, and a sheet material having a special shape such as an envelope and index paper, can be used.

The sheet S loaded on the feeding cassette 11 is fed out from the feeding cassette 11 by a feed roller 17 and sent to a registration roller 15. The registration roller 15 sends the sheet S toward the secondary transfer unit N2 at a timing synchronized with the start of toner image creation by the image forming stations PY to PK. The sheet S on which an image is formed by passing through the secondary transfer unit N2 and the fixing unit 14 is conveyed through a discharge path inside the image forming apparatus and discharged to a sheet discharge tray 16 provided on the side of the apparatus body 19.

The control unit 30 includes a CPU, a RAM, and a ROM, and controls each unit in the image forming apparatus 10. The CPU outputs an output signal to each electric component in order to operate the electric component at a desired timing and with a necessary control amount based on a detection signal input from each sensor and information stored in the ROM. Therefore, the CPU actually controls the electric components. The ROM and the RAM store information data necessary for controlling each unit, and the CPU reads the information data stored in the ROM and writes the information data in the RAM. It is assumed that the control unit 30 also controls the automatic document reading apparatus 101.

As the image forming unit 12, instead of the above configuration, for example, a direct transfer type electrophotographic mechanism that directly transfers a toner image formed on a photosensitive member to the sheet S without using an intermediate transfer member may be used. Furthermore, without being limited to the electrophotographic system, for example, an inkjet-type printing unit or an offset printing mechanism may be used as the image forming unit 12.

Automatic Document Reading Apparatus

Figure 2:
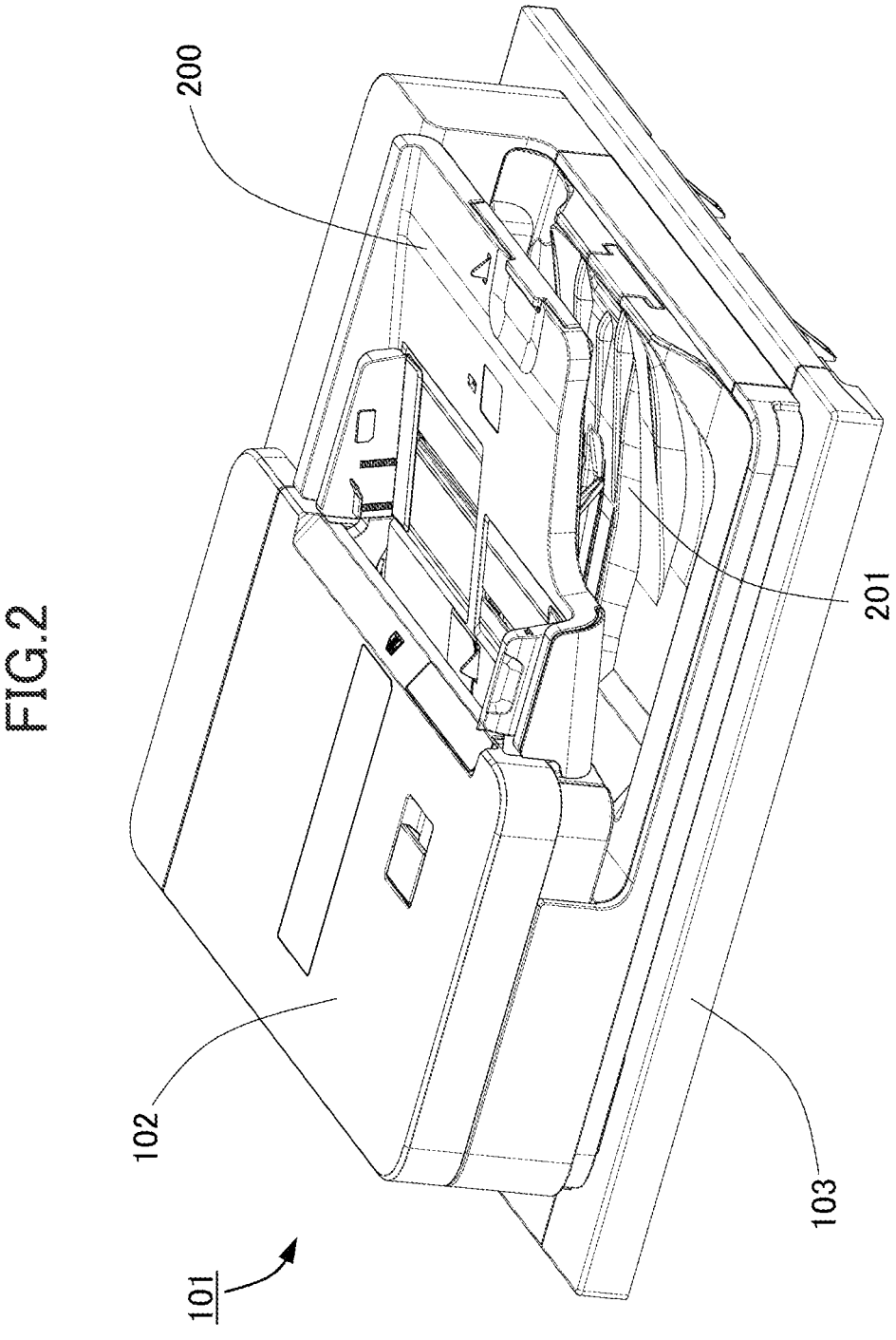
FIG. 2 is a perspective view showing an automatic document reading apparatus according to the embodiment.
Figure 3:
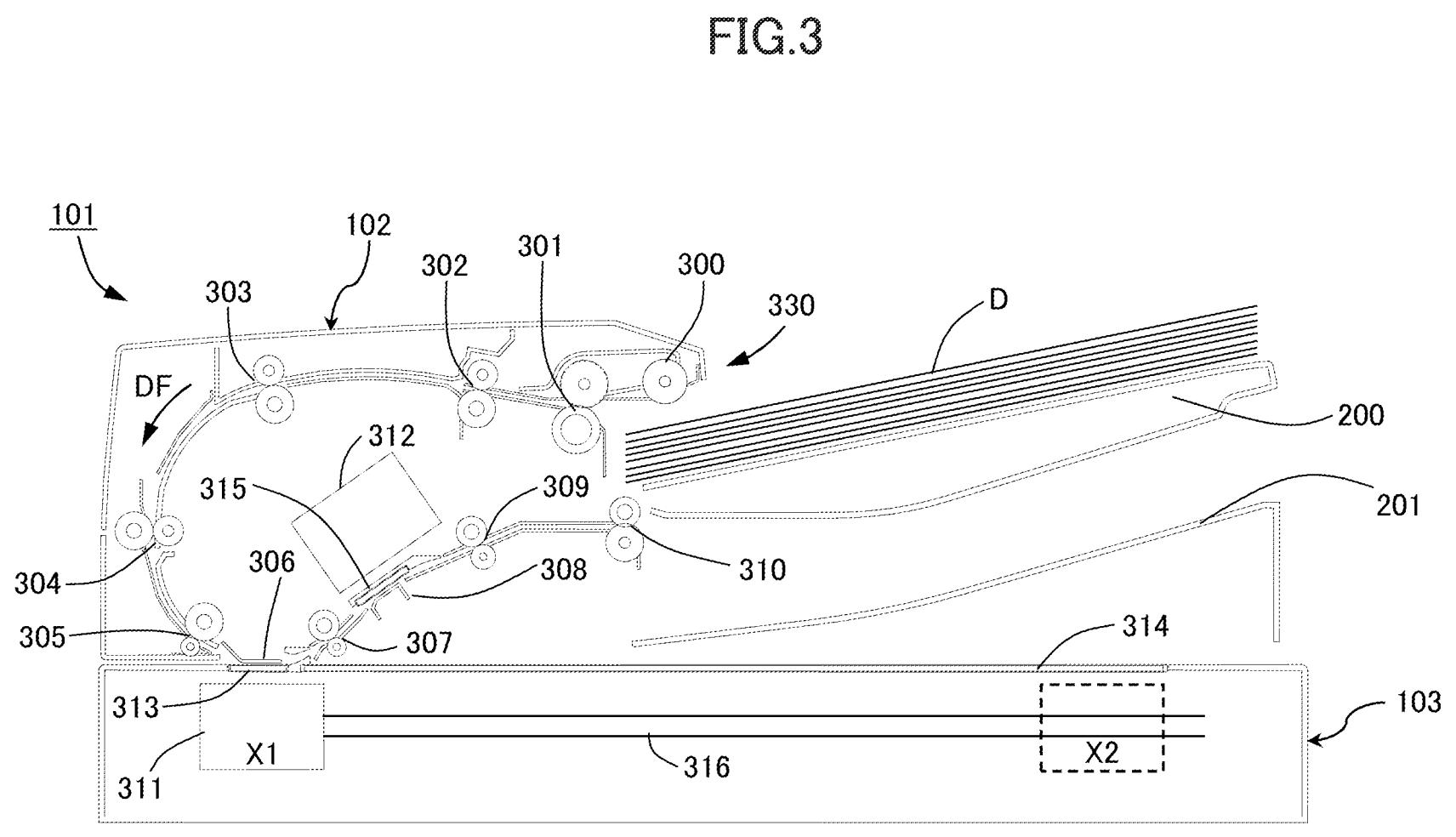

Next, a configuration of the automatic document reading apparatus 101 which is an image reading apparatus according to the present embodiment will be described with reference to FIGS. 2 and 3. FIG. 2 is a perspective view of the automatic document reading apparatus 101 according to the present embodiment, and FIG. 3 is a schematic view showing a cross-sectional configuration thereof.

The automatic document reading apparatus 101 includes an auto document feeder (ADF) 102 that conveys a document, and a reader 103 that reads image information from a moving document conveyed by the ADF 102 and a stationary document placed on a platen glass 314. The ADF 102 is openably coupled to the reader 103 fixed to the upper portion of the apparatus body 19 of the image forming apparatus 10 via an opening/closing hinge provided on the back side of the upper surface of the reader 103.

The reader 103 includes the platen glass 314, a front-side reading unit 311, and a reading movement guide 316. The reading unit 311 will be described later. The reader 103 performs a fixed-reading operation of scanning the surface of the document placed on the platen glass 314 via the platen glass 314 which is a transparent member while moving the reading unit 311 along the reading movement guide 316 using a motor. In this case, the reading unit 311 acquires line images in the main scanning direction (alignment direction of a CCD 408) line by line, and integrates the line images in the moving direction of the reading unit 311, which is a sub-scanning direction, thereby acquiring image data of the entire document.

Further, the reader 103 is provided with a feeding-reading glass 313 for a front surface which is a transparent member different from the platen glass 314. When the automatic document reading apparatus 101 performs a feeding-reading operation of reading image data while conveying documents one by one by the ADF 102, the reading unit 311 scans the front surface (first surface) of the document through the feeding-reading glass 313 and reads the image data of the front surface. The feeding-reading glass 313 is an example of a transparent member forming a part of the conveyance path. Also in this case, the reading unit 311 acquires line images in the main scanning direction line by line, and integrates the line images in the document conveying direction DF, which is the sub-scanning direction, to acquire image data of the entire front surface of the document. In FIG. 3, a position X1 of the reading unit 311 is a feeding-reading position, and a position X2 is a reading end position of fixed-reading.

The ADF 102 includes a document tray 200, a pickup roller 300, a separation roller pair 302, a drawing roller pair 303, an upstream lead roller pair 305, an intermediate lead roller pair 307, a downstream lead roller pair 309, a sheet discharge roller pair 310, and a sheet discharge tray 201. The document tray 200 is a stacking unit capable of stacking a plurality of documents D which are sheets to be read. The pickup roller 300 abuts on the upper surface of the bundle of documents stacked on the document tray 200 and sends out the uppermost document toward the separation roller pair 302. The separation roller pair 302 includes a conveyance roller and a separation roller that form a separation nip, and conveys the documents fed by the pickup roller 300 while separating the documents one by one. The separation roller that separates the document D is connected to, for example, a shaft fixed to the frame body of the ADF 102 via a torque limiter, and separates the document D by applying a frictional force to the document D at the separation nip.

The drawing roller pair 303, the upstream lead roller pair 305, the intermediate lead roller pair 307, the downstream lead roller pair 309, and the sheet discharge roller pair 310 are disposed along a conveyance path curved in a U shape from the document tray 200 toward the sheet discharge tray 201 disposed below the document tray. These roller pairs constitute a conveying unit 330 that conveys the document D in the conveyance path via the reading position. The drawing roller pair 303 nips the document that has passed through the separation nip and conveys the document toward the upstream lead roller pair 305. The upstream lead roller pair 305 conveys the document via a position where the reading unit 311 scans the front surface of the document through the feeding-reading glass 313. The reading unit 311 and the feeding-reading glass 313 are disposed between the upstream lead roller pair 305 and the intermediate lead roller pair 307 in the conveying direction DF of the document D on the conveyance path inside the ADF 102.

Here, the ADF 102 of the present embodiment includes a reading unit 312 for the back surface that reads image data from the back surface (second surface) of the document, and a feeding-reading glass 315 for the back surface that is a transparent member. The reading unit 312 will be described later. The reading unit 312 and the feeding-reading glass 315 are disposed between the intermediate lead roller pair 307 and the downstream lead roller pair 309 in the conveying direction DF on the conveyance path inside the ADF 102. In the feeding-reading operation, the document D is conveyed through a position where the reading unit 312 scans the back surface of the document D through the feeding-reading glass 315. The feeding-reading glass 315 is an example of a transparent member forming a part of the conveyance path. In this case, the line images in the main scanning direction are acquired line by line by the reading unit 312, and the line images are integrated with respect to the conveying direction DF of the document D which is the sub-scanning direction, whereby the image data of the entire back surface of the document D is acquired. That is, the reading unit 312 can scan the back surface of the document D at the back surface reading position and read the image data of the back surface in parallel with the reading of the image data of the front surface by the reading unit 311.

The document that has passed through the back surface reading position is conveyed toward the sheet discharge roller pair 310 by the downstream lead roller pair 309. The sheet discharge roller pair 310 discharges the document D, from which the image data has been read, to the sheet discharge tray 201. In a case where a plurality of documents D is stacked on the document tray 200, the automatic document reading apparatus 101 repeats a series of operations including feeding, separating, conveying, reading of image data from the front surface and/or the back surface, and discharging of the documents D until the feeding-reading operation of the final document is completed.

Reading Unit

Next, the reading units 311 and 312 will be described with reference to FIGS. 3 and 4. FIG. 3 is a cross-sectional view of the reading units 311 and 312 and a peripheral configuration thereof. Note that the reading units 311 and 312 are similar in configuration only with different installation positions and orientations, and thus only the reading unit 311 will be described, and the reading unit 312 will be denoted by the same reference numeral and detailed description thereof will be omitted.

The reading unit 311 is an integrated scanning optical unit of a charge coupled device (CCD) system. The reading unit 311 includes a box frame 410, an illumination unit 400, a first mirror 402, a second mirror 403, a third mirror 404, a fourth mirror 405, a fifth mirror 406, a lens unit 407, and a CCD 408. The illumination unit 400 is attached to an upper portion of the box frame 410. The illumination unit 400 includes a first illumination unit 41 and a second illumination unit 42. In the reading unit 311, the first illumination unit 41 emits light toward the document D from the upstream side in the conveying direction DF, and the second illumination unit 42 emits light from the downstream side in the conveying direction DF. In the reading unit 312, the first illumination unit 41 emits light toward the document D from the downstream side in the conveying direction DF, and the second illumination unit 42 emits light from the upstream side in the conveying direction DF. The illumination unit 400 is an example of a light source that emits light toward the document D. As the reading units 311 and 312, other image sensor units may be used. For example, a CIS system may be applied instead of the CCD system.

Figure 4:
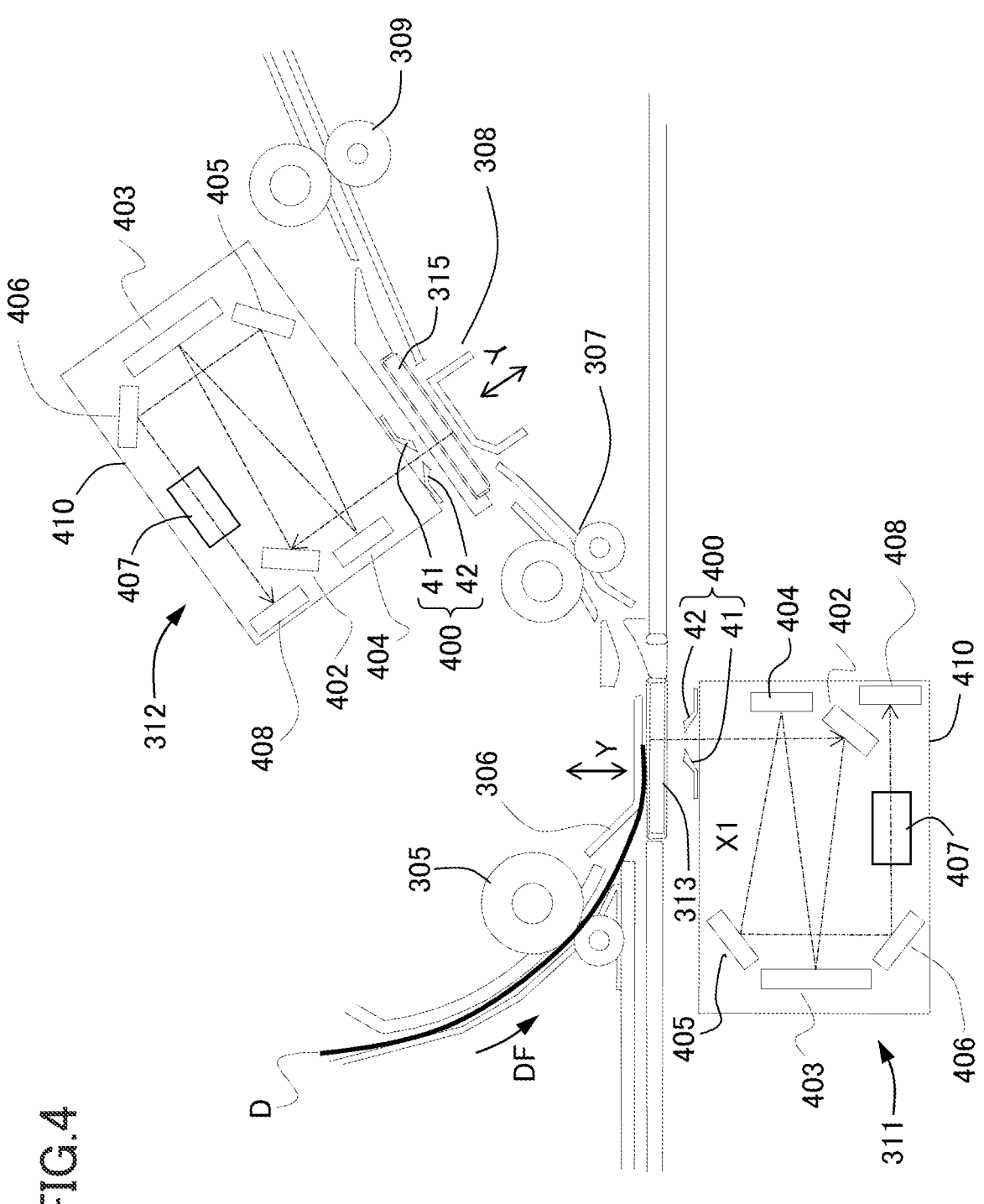
FIG. 4 is a cross-sectional view showing a reading unit according to the embodiment.

As shown in FIG. 4, illumination light is emitted from the illumination unit 400 mounted on the reading unit 311, and the surface of the platen member 306 or the document D is irradiated with the illumination light via the feeding-reading glass 313. Reflection light reflected from the platen member 306 and the document D is incident on the CCD 408 via the feeding-reading glass 313 and a mirror and a lens provided in the reading unit 311, and image information of the surface of the document D is acquired. On the other hand, illumination light is emitted from the illumination unit 400 mounted on the reading unit 312 to irradiate the platen member 308 and the back surface of the document D via the feeding-reading glass 315. Reflection light reflected from the platen member 308 and the document D is incident on the CCD 408 via the feeding-reading glass 315 and a mirror and a lens provided in the reading unit 312, and image information of the back surface of the document D is acquired. The CCD 408 is an example of a reading portion that reads an image of the document D conveyed by the conveying unit 330 through reflection light of the light irradiated from the illumination unit 400 via the feeding-reading glasses 313 and 315.

The platen members 306 and 308 are examples of opposing members that are disposed to face the feeding-reading glasses 313 and 315 in an opposing direction at the reading positions of the reading units 311 and 312 and form a conveyance path together with the feeding-reading glasses 313 and 315. Note that the conveyance path includes a space where a sheet is conveyed. The platen members 306 and 308 are configured to retract so that the document conveyance path expands in the direction Y perpendicular to the document D according to the thickness of the document D when reading the document D. As a result, an image defect caused by a decrease in the document conveying speed due to the thick document D is prevented.

Reading Configuration of Document Leading Edge

Figure 5:
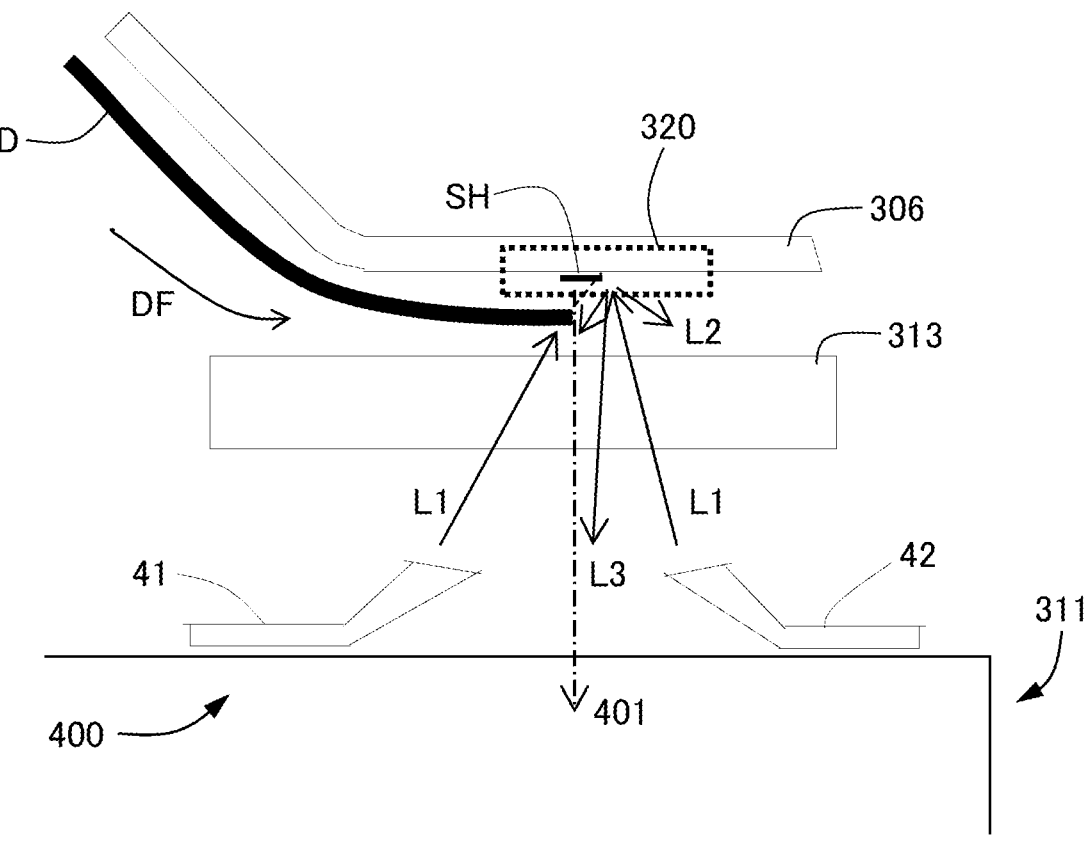
FIG. 5 is a cross-sectional view showing irradiation and reflection from an illumination unit according to the embodiment.

Next, FIG. 5 shows a reading configuration of the document leading edge. The illumination light L1 emitted from the illumination unit 400 mounted on the reading unit 311 is reflected by the platen member 306 and the document D, and diffuse reflection light L2 and specular reflection light L3 are generated. The image is read by reading the diffuse reflection light L2 and the specular reflection light L3 by the CCD 408 through a reading line 401.

Skew Correction

Next, skew correction at the time of image reading will be described with reference to FIGS. 3 to 7B. Here, in the present embodiment, the control of the skew correction is executed by the control unit 30 provided in the image forming apparatus 10, but the present invention is not limited thereto, and the control unit may be included in the automatic document reading apparatus 101 or an external apparatus and the skew correction may be executed by the control unit. That is, the control unit 30 can execute skew correction based on the image of the document D read by the CCD 408, and the control unit 30 may be installed at any location.

As shown in FIG. 3, since the documents D read by the reading units 311 and 312 are read without aligning the leading edges of the documents D, there is a possibility that the document D is skewed before passing through the feeding-reading glasses 313 and 315 and the read document is bent and read. Therefore, the control unit 30 detects the skew amount of the conveyed document from the read image and corrects the inclination (skew) of the image using the result. In the present embodiment, the control unit 30 corrects the skew of the document based on the shadow of the document projected on an uneven surface portion 320 to be described later read by the reading units 311 and 312.

Figure 6A:
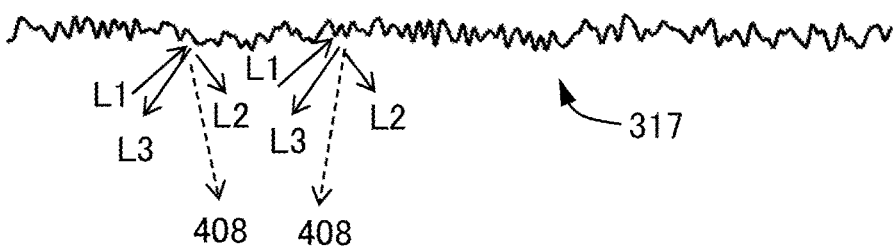
FIG. 6A is a cross-sectional view of a platen member showing a surface having random unevenness.
Figure 7A:
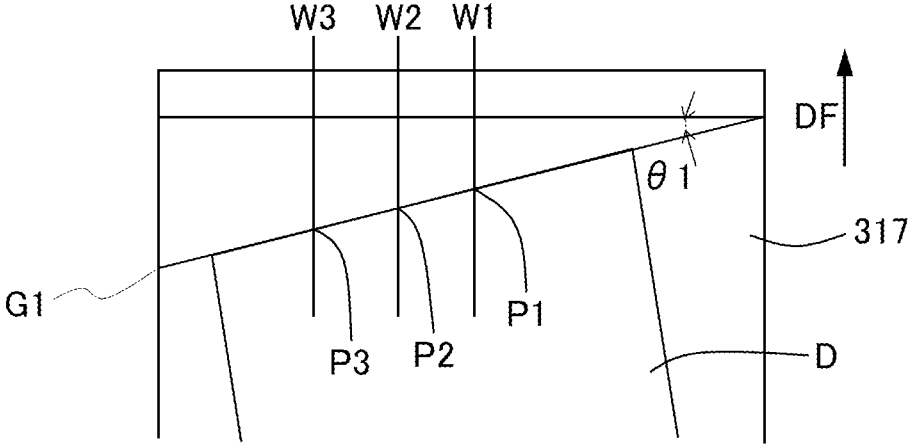
FIG. 7A is a plan view when the leading edge of a document is read using the platen member shown in FIG. 6A.
Figure 7B:
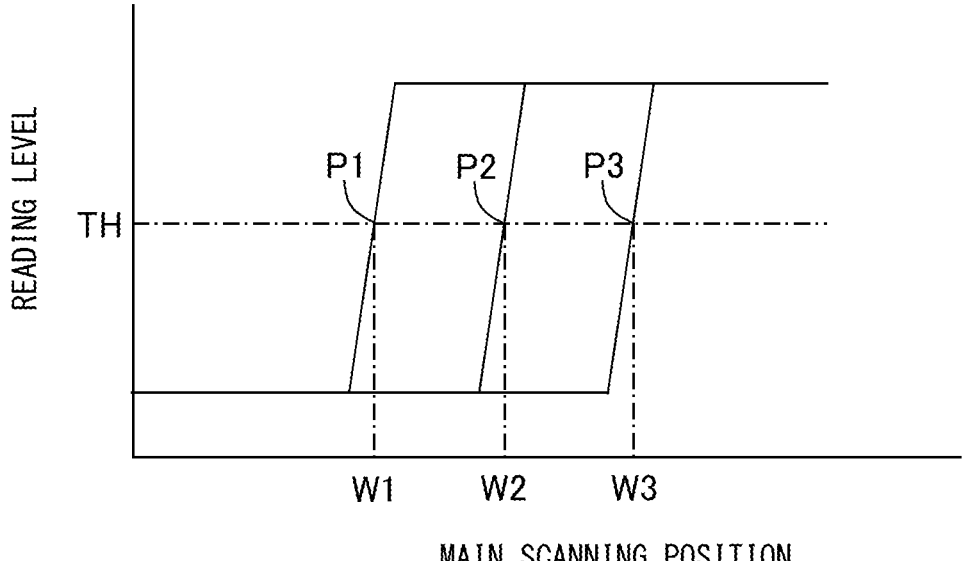
FIG. 7B is a graph showing a reading level with respect to a main scanning position when the leading edge of a document is read using the platen member shown in FIG. 6A.

Here, a comparative example in which the specular reflection light L3 is prevented from being read toward the CCD 408 using the platen member 317 will be described. FIG. 7A is a diagram showing a leading edge of an image in a case where a color of the surface of the platen member 317 is white and a random regular antireflection surface as shown in FIG. 6A, and a skewed white document D is read. As shown in FIG. 6A, the surface of the platen member 317 has a regular antireflection shape that prevents the specular reflection light L3 from being read toward the CCD 408 due to its surface property. As shown in FIG. 7B, the read levels at the main scanning positions W1, W2, and W3, which are predetermined positions in the main scanning direction, are sampled for each sub-scanning line with respect to the read image. Here, in FIG. 7B, the predetermined positions are set at three places, but the positions may be set at two or more places of the main scanning position and a number equal to or less than the maximum number of pixels to be read in the main scanning direction.

FIG. 7B is a diagram showing image reading levels at main scanning positions W1, W2, and W3 in FIG. 7A. In detecting the leading edge of the document D, a predetermined reading level is set as a luminance threshold TH, and a main scanning position first exceeding the luminance threshold TH is detected as a document leading edge or a shadow SH (see FIG. 5). A leading edge position of the main scanning position W1 is P1, a leading edge position of the main scanning position W2 is P2, and a leading edge position of the main scanning position W3 is P3. When the document is inclined as shown in FIG. 7A, the document leading edge position at each main scanning position is different. Using the main scanning positions W1, W2, and W3 and the leading edges P1, P2, and P3 at the respective main scanning positions, the boundary line G1 between the platen member 317 and the document D can be calculated to obtain the inclination of the document D.

Here, in a case where the random regular antireflection surface shown in FIG. 6A is actually formed, for example, it is conceivable to form a fine unevenness shape by using honing processing or embossing on the surface of the mold for molding the sheet passing surface of the platen member 317. By manufacturing the platen member 317 using this mold, reflection of light can be easily diffused when the illumination light is reflected by the platen member 317. That is, it is possible to read the leading edge of the document while suppressing an inadvertent change in the reading level when the reflection light is read by the reading units 311 and 312 due to the specular reflection light from the platen member 317.

However, honing processing and embossing that are conventionally used are surface processing in which glass beads or the like are sprayed onto the surface of a mold, or surface processing by etching treatment with a chemical agent. For this reason, there is no regularity in the shape of the unevenness on the surface of the mold, and it is difficult to control the depth of the unevenness and the density of the unevenness. Therefore, a portion having no unevenness shape may be formed on the platen member 317, or unevenness may not be transferred and unevenness may not be formed on the component surface due to a slight difference in mold molding conditions (temperature, pressure, and the like).

Figure 6B:
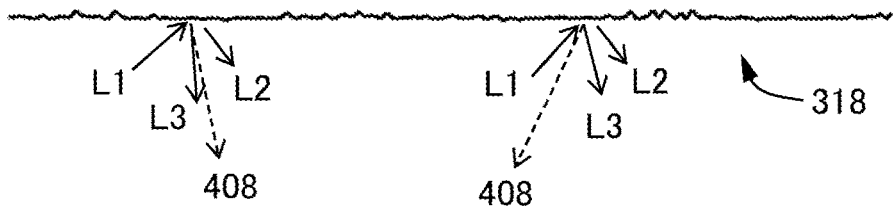
FIG. 6B is a cross-sectional view of the platen member showing a surface having random unevenness partially having a flat surface.
Figure 8A:
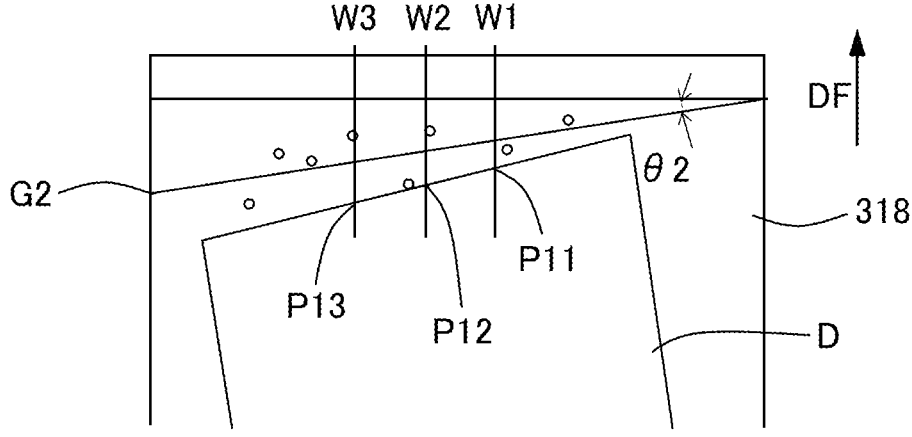
FIG. 8A is a plan view when the leading edge of a document is read using the platen member shown in FIG. 6B.
Figure 8B:
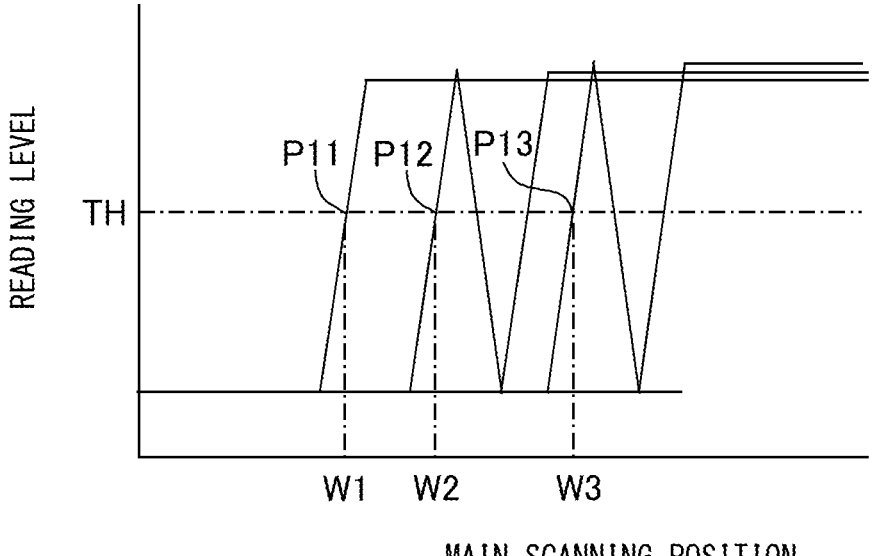
FIG. 8B is a graph showing a reading level with respect to a main scanning position when the leading edge of a document is read using the platen member shown in FIG. 6B.

A case where the regular antireflection surface of the platen member 318 is partially flat as shown in FIG. 6B will be described. In this case, as shown in FIG. 8A, in a case where a white document D skewed is read by specular reflection light from the plane of the regular antireflection surface of the platen member 318, there is a possibility that specular reflection light from the platen member 318 is read before reading the original image front end portion. When the reading levels at the predetermined main scanning positions W1, W2, and W3 are sampled for each sub-scanning line with respect to this image, as shown in FIG. 8B, there is a possibility that the luminance of the portion where the regular reflection light is read exceeds the luminance threshold TH. As a result, at the main scanning positions W1, W2, and W3, the main scanning position erroneously detected as the document leading edge may be erroneously detected as P11, P12, and P13. As a result, the inclination of the leading edge of the document is calculated as indicated by G2 in FIG. 8A, and the inclination of the document D is erroneously detected. Therefore, the skew correction accuracy decreases, and the skew of the document D may not be correctly corrected.

Figure 9A:
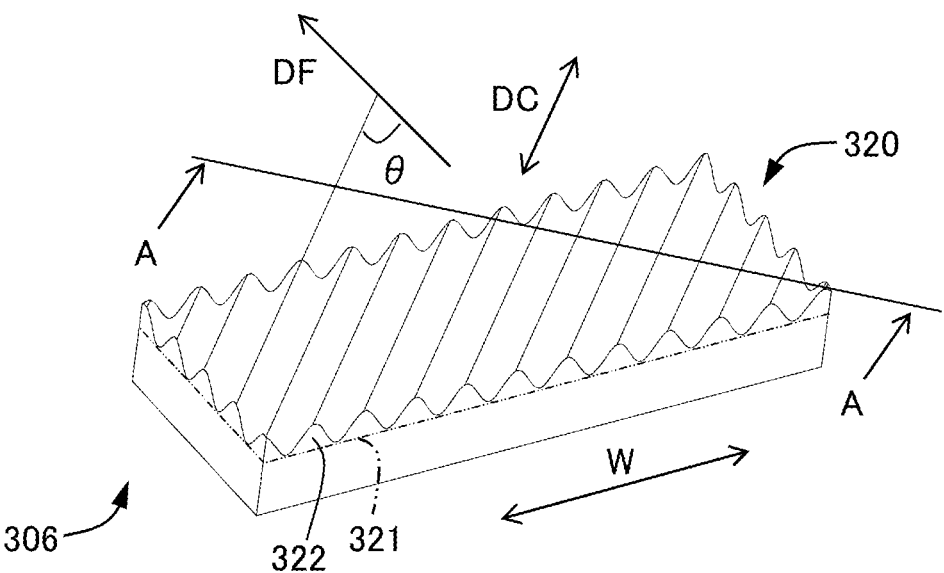
FIG. 9A is a perspective view showing an uneven surface portion of the platen member according to the embodiment.

Therefore, in the present embodiment, the surface of the platen member 306 (308) is provided with the uneven surface portion 320 having the unevenness shape that can stably transfer the surface shape with respect to the molding conditions and that is periodically continuous, thereby suppressing the degradation of the skew correction accuracy due to the regular reflection light. Here, as shown in FIG. 9A, the opposing surface 321 of the platen member 306 (308) facing the feeding-reading glass 313 (315) has the uneven surface portion 320 having a shape in which projecting portions 322 are regularly and continuously arranged. That is, the platen member 306 (308) includes the uneven surface portion 320 facing the feeding-reading glass 313 (315). The uneven surface portion 320 includes a plurality of projecting portions 322 projecting toward the feeding-reading glass 313 (315). The plurality of projecting portions 320 is regularly and continuously arranged when viewed in the opposing direction. Therefore, the opposing surface 321 is subjected to regular antireflection processing for preventing regular reflection of the illumination light emitted from the illumination unit 400 to the platen member 306 into the reading unit 311. The uneven surface portion 320 is provided to face the entire reading range of the reading unit 311 in the width direction of the document D. That is, the CCD 408 has the reading range in which the CCD 408 reads an image of a document and that extends in the width direction of a document. Note that the opposing surface 321 is defined as a virtual plane opposing to the feeding-reading glass 313 (315) and intersected with the opposing direction toward the feeding-reading glass 313 (315).

Figure 9B:
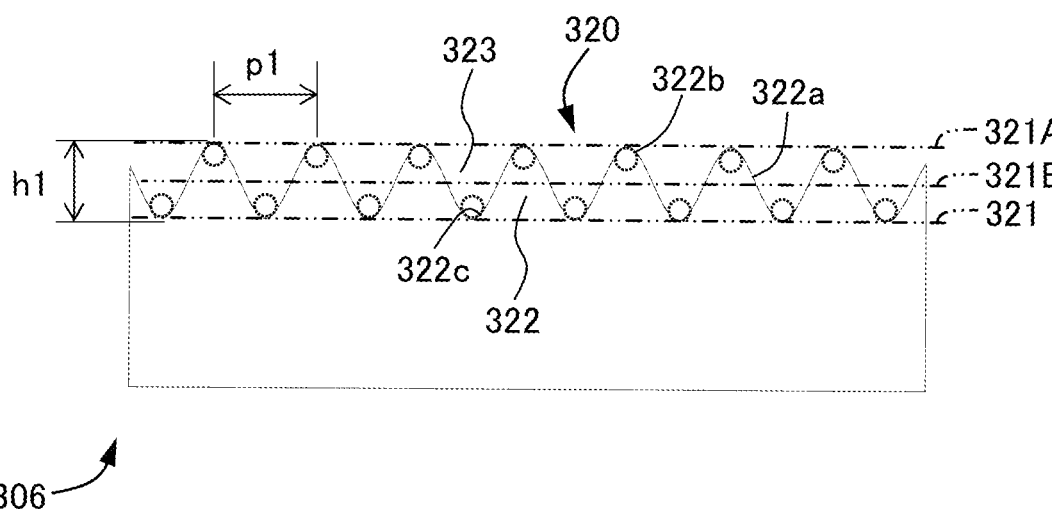
FIG. 9B is a cross-sectional view of the uneven surface portion of the platen member according to the embodiment taken along line A-A in FIG. 9A.

As a definition of the uneven surface portion 320, in the present embodiment, the projecting portions 322 are provided to protrude from the opposing surface 321, and an aggregate of the projecting portions 322 is the uneven surface portion 320. However, the definition of the uneven surface portion 320 is not limited to this, and may vary depending on how the opposing surface 321 is taken. For example, as shown in FIG. 9B, the shape may be defined such that recess portions 323 having a shape recessed from the opposing surface 321A are regularly and continuously arranged. In this case, the uneven surface portion 320 includes a plurality of recess portions 323 recessing toward a direction away from the feeding-reading glass 313 (315). The plurality of recess portions 323 is regularly and continuously arranged when viewed in the opposing direction. Also, in a cross-section of the uneven surface portion 320 along a plane along the opposing direction, each of the plurality of recess portions 323 includes a bottom portion 322c having an arc shape. Furthermore, the shape may be defined such that the projecting portion 322 and the recess portion 323 are regularly and continuously arranged with respect to the opposing surface 321B. In this case, the uneven surface portion 320 includes a plurality of projecting portions 322 projecting toward the feeding-reading glass 313 (315), and a plurality of recess portions 323 recessing toward a direction away from the feeding-reading glass 313 (315). The plurality of projecting portions 322 and the plurality of recess portions 323 are regularly and continuously arranged when viewed in the opposing direction.

In the present embodiment, the uneven surface portion 320 includes a plurality of surfaces 322a inclined with respect to the opposing surface 321, and does not have a surface parallel to the opposing surface 321. Thus, regular reflection light can be prevented from being generated. As shown in FIG. 9A, each of the projecting portions 322 is formed to extend in a linear shape when viewed in a direction orthogonal to the opposing surface 321, i.e., the opposing direction. Note that each of the projecting portions 322 may have another shape such as a line shape including a curved shape and a zigzag shape, or a longitudinal shape when viewed in a direction orthogonal to the opposing surface 321, but are preferably simple straight lines from the viewpoint of accuracy at the time of molding using a mold described later.

As shown in FIG. 9B, in a cross-section along a plane (A-A) intersecting (orthogonal to) the direction DC in which the vertices 322b of the projecting portions 322 are continuous, the vertices 322b of the projecting portions 322 have an arc shape. That is, in a cross-section of the uneven surface portion 320 along a plane along the opposing direction, each of the plurality of projecting portions 320 includes a vertices 322b, serving as a top portion, having an arc shape. Similarly, the bottom 322c between the projecting portions 322 also has an arcuate cross-sectional shape in the cut plane A-A. As a result, the area of the uneven surface portion 320 that generates the light beam to the CCD 408 can be extremely reduced, the specular reflection light is hardly generated, and the uneven surface portion 320 can be prevented from having a surface substantially parallel to the opposing surface 321.

At least one of the plurality of projecting portions 322 extends linearly along a first direction. In the present embodiment, all projecting portions 322 extend linearly along the first direction. The direction DC in which the vertices of the projecting portions 322 are continuous and the conveying direction DF have an angle of 10 degrees or more and 80 degrees or less. That is, the direction DC (i.e., the first direction) and the main scanning direction W of the reading unit 311 have an angle of 10 degrees or more and 80 degrees or less. Here, when the angle between the direction DC and the conveying direction DF is less than 10 degrees or more than 80 degrees, there is a possibility that a light beam emitted from the illumination unit 400 arranged upstream and downstream of the conveying direction DF is reflected by the inclined surface 322a and specular reflection occurs. According to the present embodiment, even if the light beam emitted from the illumination unit 400 is reflected by the inclined surface 322a, it is possible to prevent the light beam from being incident on the reading unit 311 as regular reflection. Furthermore, in the present embodiment, the angle between the direction DC and the conveying direction DF is set to 45 degrees, and it is possible to effectively suppress the light beam from the illumination unit 400 from being incident on the reading unit 311 as regular reflection.

The size of the uneven surface portion 320 is set to a size determined based on the resolution of the CCD 408. Hereinafter, the pitch p1 of the projecting portions 322 means a pitch in a cross-section along the plane (A-A) intersecting (orthogonal to) the direction DC in which the vertices 322b of the projecting portions 322 are continuous. If the pitch p1 is too large with respect to the resolution of the CCD, the uneven surface portion 320 is read as a stripe pattern, and thus it is necessary to make the pitch p1 smaller than the resolution of the CCD 408. In addition, when the range of the pitch p1 is set, the range of the height h1 is also set in accordance with the range, which will be described in detail later. In the present embodiment, the height h1 is 50 μm or less, and the pitch p1 is 130 μm or less. In the present embodiment, a color of the uneven surface portion 320 is white.

EXAMPLES

Figure 10:
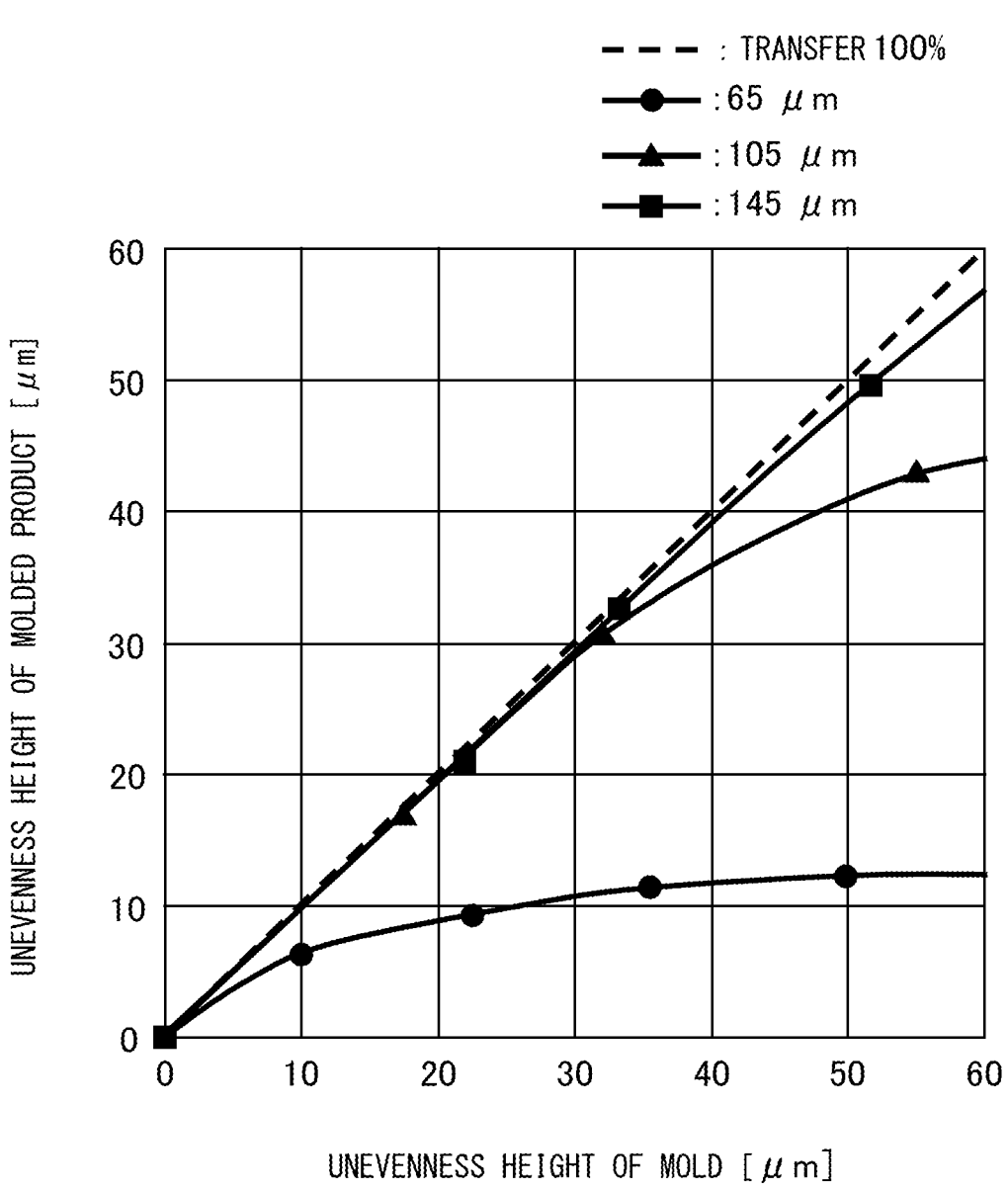
FIG. 10 is a graph showing a relationship between an unevenness height of a mold and an unevenness height of a molded product when molding the platen member according to the embodiment.

Here, the transferability when the uneven surface portion 320 having the shape of the present embodiment is formed using a synthetic resin of polycarbonate (PC) and acrylonitrile-butadiene-styrene (ABS) as an example of the platen member 306 is shown in FIG. 10. In the case of providing a fine shape using such a synthetic resin, if the pitch p1 of the projecting portions 322 is narrow, there is a limit on the unevenness height h1 that can be transferred to the molded product due to the unevenness height of the mold. If the unevenness height h1 of the molded product is lower than the unevenness height of the mold, the triangular shape provided in the mold is not transferred, and the substantially planar shape portion increases. When the size of the specular reflection light reflected by the substantially planar shape portion increases, the specular reflection light at the time of reading the platen member 306 becomes strong and is resolved as a bright spot, so that the bright spot exceeds the luminance threshold TH and is erroneously detected as the document leading edge. Therefore, it is necessary to determine the maximum pitch of the projecting portions 322 in accordance with the optical system of the device and the reading resolution so that the read specular light is not resolved.

In the present embodiment, when the pitch p1 is larger than 145 μm, the uneven surface portion 320 is read as a stripe pattern, so that the pitch p1 is set to 145 μm or less. Then, from FIG. 10, the maximum height of the mold to be transferred is determined from the pitch p1 of the projecting portions 322. By forming the shape determined in this manner into a mold for molding the platen member 306, an unevenness shape having stable transferability against changes in molding conditions can be formed.

In the present embodiment, the regular reflection light can be prevented from being resolved by setting the pitch p1 of the projecting portions 322 to 145 μm or less, and thus, 105 μm in which the interval is further shortened therefrom is set as the pitch p1. In the present embodiment, the height h1 of one of the projecting portions 322 of the molded product is set to 30 μm so that the width of the untransferred surface formed per one of the projecting portions 322 of the molded product is reduced from the pitch p1 determined here and the mold unevenness height in FIG. 10.

Figure 11:
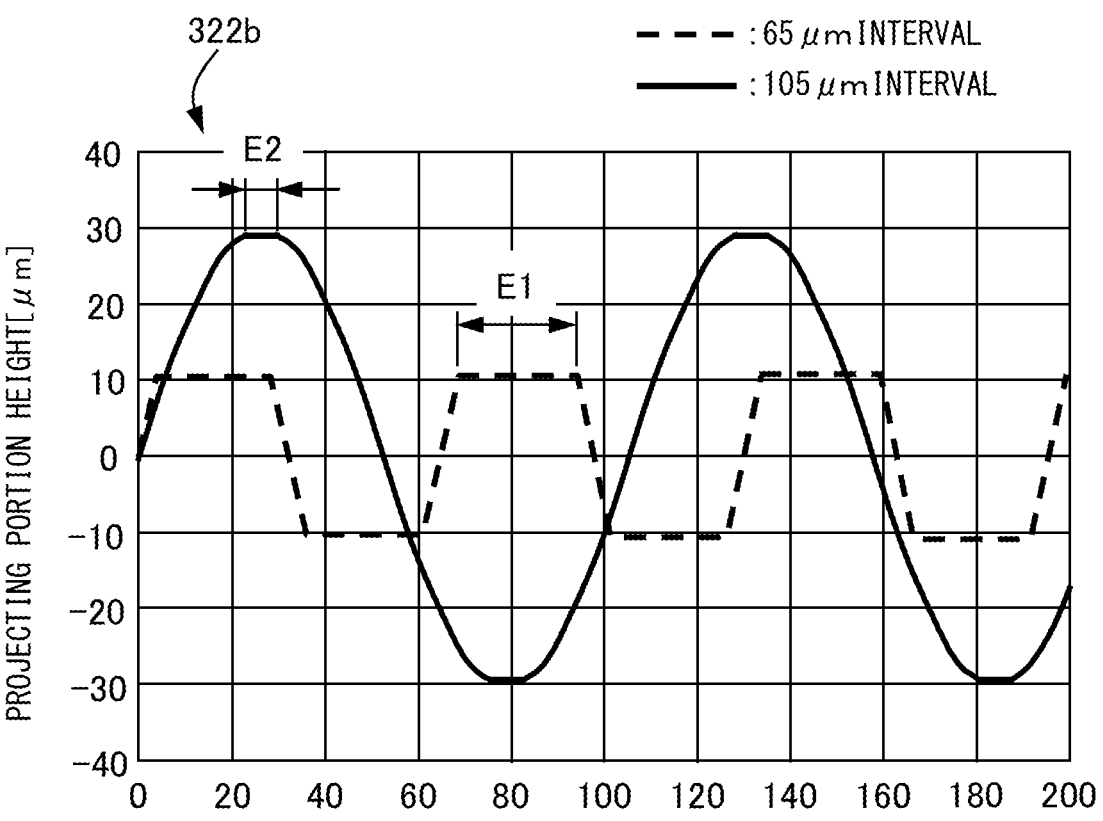
FIG. 11 is a graph showing a relationship between the position in the main scanning direction and the height of a projecting portion with respect to the pitch of projecting portions when molding the platen member according to the embodiment.

As shown in FIG. 10, since the transferability differs depending on the pitch p1, even when molding is performed at the same heights h1 of the projecting portions 322, the width of the plane of the unevenness shape of the surface is different as shown in E1 and E2 of FIG. 11, and thus, it is preferable to increase the unevenness height. Specifically, the height h1 is preferably 10 μm or more and 50 μm or less, and the pitch p1 is preferably 50 μm or more and 145 μm or less.

Figure 6C:
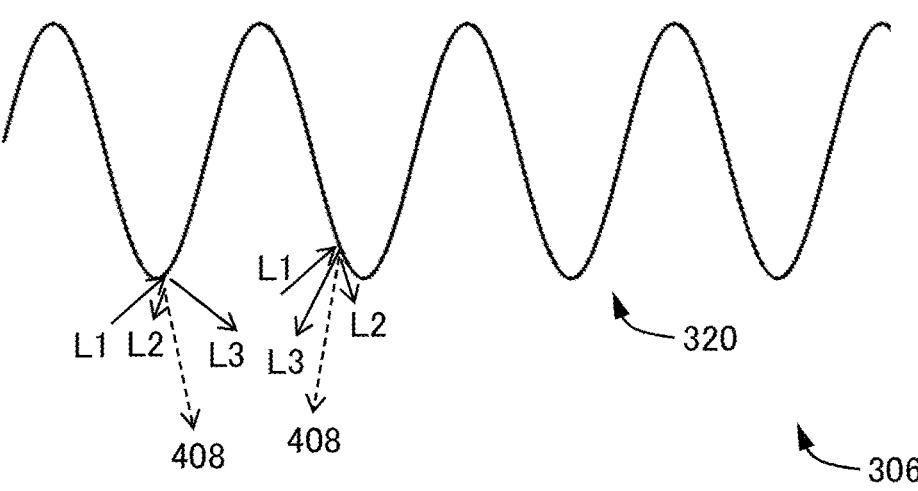
FIG. 6C is a cross-sectional view of the platen member showing a surface having an uneven surface portion according to the present embodiment.

Here, as shown in FIG. 11, in a case where the pitch p1 is 105 μm, a plane parallel to the opposing surface 321 is slightly generated at the vertex 322b of the projecting portions 322. On the other hand, in the present embodiment, the vertex 322b is arranged in a continuous shape 452 inclined by θ with respect to the document conveying direction DF. As a result, the direction of the reflection light reflected from the uneven surface portion 320 by the illumination light can be directed so as to be twisted from the main scanning direction, and the regular reflection light can be made difficult to travel toward the reading unit 311. In the present embodiment, by inclining at θ=45 degrees, the reflection light is arranged so as to be inclined with respect to both the main scanning direction and the sub-scanning direction. With such a shape, the illumination light emitted from the illumination unit 400 is reflected by the platen member 306 as shown in FIG. 6C, and the specular reflection light L3 reflected by the platen member 306 is less likely to be reflected toward the CCD 408.

As described above, according to the automatic document reading apparatus 101 of the present embodiment, since the uneven surface portions 320 are formed on the platen members 306 and 308, specular reflection light from the platen members 306 and 308 can be made difficult to travel toward the CCD 408. Therefore, it is possible to suppress the occurrence of the luminance change due to the specular reflection component from the platen members 306 and 308, to prevent erroneous detection of the document leading edge, and to improve the skew correction accuracy.

According to the present invention, the accuracy of skew correction can be improved.

Other Embodiments

In the present embodiment described above, the case where the uneven surface portion 320 has an arc shape at both the vertex 322b and the bottom 322c has been described, but the present invention is not limited thereto. For example, the uneven surface portion may have a shape in which projecting portions are continuously arranged in a triangular cross-section. In this case, both the vertex and the bottom have a shape having an acute cross-section, and can be prevented from having a surface parallel to the opposing surface. Alternatively, the uneven surface portion may have a shape in which projecting portions are continuously arranged in a semicircular cross-section. In this case, the vertex has an arc shape, and the bottom has a cross-section having an acute angle, so that the bottom does not have a surface parallel to the opposing surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-015150, filed Feb. 3, 2023, which is hereby incorporated by reference herein in its entirety.

What is claimed is:

1. An image reading apparatus comprising:
a conveying unit configured to convey a document in a conveyance path;
a transparent member configured to form a part of the conveyance path;
a reading unit including a light source configured to irradiate a document with light, and a reading portion configured to read an image of a document conveyed by the conveying unit through reflection light of the light irradiated from the light source via the transparent member; and
an opposing member disposed to face the transparent member in an opposing direction at a reading position of the reading unit and configured to form the conveyance path together with the transparent member,
wherein the opposing member includes an uneven surface portion facing the transparent member and including a plurality of projecting portions which is regularly and continuously arranged when viewed in the opposing direction, the uneven surface portion being read by the reading portion of the reading unit, and
wherein each of the plurality of projecting portions extends in a line shape when viewed in the opposing direction.

2. The image reading apparatus according to claim 1, wherein the uneven surface portion includes a plurality of surfaces inclined with respect to a virtual plane intersected with the opposing direction toward the transparent member.

3. The image reading apparatus according to claim 1, wherein the line shape is a linear shape.

4. The image reading apparatus according to claim 3, wherein the plurality of projecting portions is arranged in parallel to each other.

5. The image reading apparatus according to claim 3,
wherein at least one of the plurality of projecting portions extends linearly along a first direction, and
wherein the first direction has an angle of 10 degrees or more and 80 degrees or less to a main scanning direction of the reading portion.

6. The image reading apparatus according to claim 5, wherein the first direction has an angle of 45 degrees to the main scanning direction of the reading portion.

7. The image reading apparatus according to claim 1, wherein in a cross-section of the uneven surface portion along a plane along the opposing direction, each of the plurality of projecting portions includes a top portion having an arc shape.

8. The image reading apparatus according to claim 1, wherein a size of each of the plurality of projecting portions is a size determined based on a resolution of the reading portion.

9. The image reading apparatus according to claim 1, wherein each of the plurality of projecting portions has a height of 10 μm or more and 50 μm or less, and the plurality of projecting portions has a pitch of 10 μm or more and 145 μm or less.

10. The image reading apparatus according to claim 1,
wherein the reading portion has a reading range in which the reading portion reads an image of a document and that extends in a width direction intersected with a conveying direction of a document, and
wherein the uneven surface portion is provided to face the reading range of the reading portion.

11. The image reading apparatus according to claim 1, wherein a color of the uneven surface portion is white.

12. The image reading apparatus according to claim 1, further comprising:
a control unit configured to correct skew of a document based on an image of a document read by the reading portion.

13. The image reading apparatus according to claim 12, wherein a control unit configured to correct skew of a document by correcting an inclination of an image of a document read by the reading portion.

14. The image reading apparatus according to claim 1, further comprising:
a control unit configured to correct skew of a document based on a shadow of a document projected on the uneven surface portion read by the reading portion.

15. An image forming apparatus comprising:
the image reading apparatus according to claim 1 and configured to read an image of a document; and
an image forming unit configured to form an image on a sheet based on image information read by the image reading apparatus.

16. An image reading apparatus comprising:
a conveying unit configured to convey a document along a conveyance path;
a transparent member configured to form a part of the conveyance path;
a reading unit including a light source configured to irradiate a document with light, and a reading portion configured to read an image of a document conveyed by the conveying unit through reflection light of the light irradiated from the light source via the transparent member; and an opposing member disposed to face the transparent member in an opposing direction at a reading position of the reading unit and configured to form the conveyance path together with the transparent member, wherein the opposing member includes an uneven surface portion facing the transparent member and including a plurality of recess portions which is regularly and continuously arranged when viewed in the opposing direction, the uneven surface portion being read by the reading portion of the reading unit, and wherein each of the plurality of recess portions extends in a line shape when viewed in the opposing direction.

17. The image reading apparatus according to claim 16, wherein in a cross-section of the uneven surface portion along a plane along the opposing direction, each of the plurality of recess portions includes a bottom portion having an arc shape.

18. An image reading apparatus comprising:

a conveying unit configured to convey a document along a conveyance path;

a transparent member configured to form a part of the conveyance path;

a reading unit including a light source configured to irradiate a document with light, and a reading portion configured to read an image of a document conveyed by the conveying unit as reflection light of the light irradiated from the light source via the transparent member; and an opposing member disposed to face the transparent member in an opposing direction at a reading position of the reading unit and configured to form the conveyance path together with the transparent member, wherein the opposing member includes an uneven surface portion facing the transparent member, the uneven surface portion including a plurality of projecting portions and a plurality of recess portions which are regularly and continuously arranged when viewed in the opposing direction, the uneven surface portion being read by the reading portion of the reading unit, wherein each of the plurality of projecting portions extends in a line shape when viewed in the opposing direction, and wherein each of the plurality of recess portions extends in a line shape when viewed in the opposing direction.

19. The image reading apparatus according to claim 18, wherein in a cross-section of the uneven surface portion along a plane along the opposing direction, each of the plurality of projecting portions includes a top portion having an arc shape, and wherein in a cross-section of the uneven surface portion along a plane along the opposing direction, each of the plurality of recess portions includes a bottom portion having an arc shape.

* * * * *